Dec. 27, 1966    P. C. GOLDMARK ETAL    3,294,903
ELECTRONIC RECONNAISSANCE SYSTEMS
Filed April 19, 1961    10 Sheets-Sheet 1

FIG. 1

INVENTORS.
PETER C. GOLDMARK,
JOHN W. CHRISTENSEN &
BERNARD ERDE
BY Brumbaugh, Free, Graves & Donohue
their ATTORNEYS Dec. 27, 1966  P. C. GOLDMARK ETAL  3,294,903
ELECTRONIC RECONNAISSANCE SYSTEMS
Filed April 19, 1961  10 Sheets-Sheet 3

FIG. 4

INVENTORS.
PETER C. GOLDMARK,
JOHN W. CHRISTENSEN &
BERNARD ERDE
BY
Brumbaugh, Free, Graves & Donohue
their ATTORNEYS

INVENTORS.
PETER C. GOLDMARK,
JOHN W. CHRISTENSEN &
BERNARD ERDE
BY
their ATTORNEYS

FIG. 8

Dec. 27, 1966  P. C. GOLDMARK ETAL  3,294,903
ELECTRONIC RECONNAISSANCE SYSTEMS
Filed April 19, 1961  10 Sheets-Sheet 9

INVENTORS.
PETER C. GOLDMARK,
JOHN W. CHRISTENSEN &
BERNARD ERDE
BY
their ATTORNEYS

United States Patent Office 3,294,903
Patented Dec. 27, 1966

3,294,903
ELECTRONIC RECONNAISSANCE SYSTEMS
Peter C. Goldmark, Stamford, John W. Christensen, New Canaan, and Bernard Erde, Stamford, Conn., assignors to Columbia Broadcasting System, Inc., New York, N.Y., a corporation of New York
Filed Apr. 19, 1961, Ser. No. 104,113
13 Claims. (Cl. 178—6.8)

The present invention relates to electronic reconnaissance systems and, more particularly, to systems of this character that are suitable for use in conjunction with remotely located space vehicles such as artificial earth satellites, although it is not limited to such use.

Recent advances in the field of space vehicles have opened up the possibility of obtaining valuable information from time to time concerning such matters as meteorological conditions or the topography of and activity in different parts of the world by aerial reconnaissance from a station located in outer space. While systems have been developed for carrying out reconnaissance from aircraft, these are not suitable for use in a space vehicle because it is not possible to attain a high enough degree of resolution within the limits of mass and bulk that can be accommodated in the vehicle. In addition, many such systems lack the requisite versatility to obtain multiple sets of information by a variety of means and combine them in a single presentation.

Accordingly, it is an object of the invention to provide new and improved reconnaissance systems that are free from the above-noted deficiencies of the prior art.

Another object of the invention is to provide an electronic reconnaissance system of a size suitable for use within the limited confines of a space vehicle such as an artificial earth satellite and having a resolving power limited only by that of the optical equipment incorporated in the system.

It is a further object of the invention to provide means whereby the resolving power of the electronic equipment utilized in the system can be applied a plurality of times to different component parts of a single set of information generated by the optical equipment so as to obtain an overall resolving power commensurate with the resolving power of the optical components of the system.

It is another object of the invention to provide means for obtaining multiple sets of information and correlating them or combining them in a single presentation.

These and other objects are attained by scanning an object with high resolution optical means to produce a sequence of line images, and scanning each of said line images in segments, the length of each segment being selected to match its resolution to the resolution of the scanning device employed for this purpose. Preferably, the line segments are arranged in parallel side by side stacked relation, forming a substantially rectangular array which can be scanned by conventional scanning means such as a line scan camera tube of the type employed in television broadcasting. The signals generated by the scanning means may be transmitted in any suitable manner to receiver means at a remote location, where they are converted into reconstituted line images faithful to the original line images and displayed or recorded on a suitable record medium.

For a better understanding of the invention, reference is made to the following detailed description of several representative embodiments, taken in conjunction with the accompanying drawings, in which.

Figure 1:
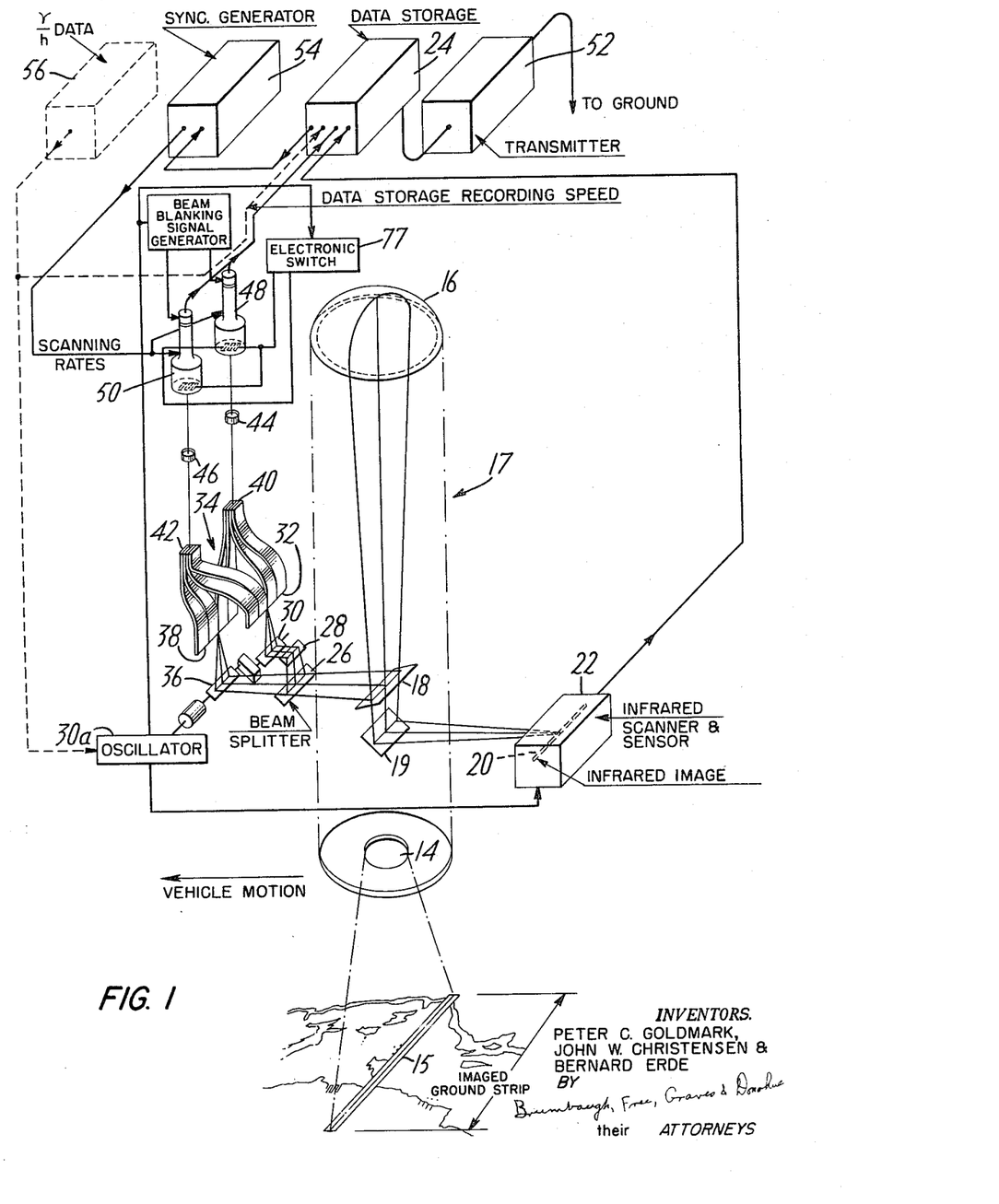
FIG. 1 is a schematic representation of the apparatus at the transmitting end of an electronic reconnaissance system constructed according to the invention.

By way of example, it will be assumed that the transmitter apparatus shown in FIG. 1 is being carried by an artificial earth satellite travelling in a given orbit about the earth. It comprises a corrector plate 14 for admitting radiations from a subject of reconnaissance 15 which may be the adjacent portion of the earth's surface, for example. The corrector plate 14 so refracts the transmitted radiations that a spherical mirror 16 upon which the radiations impinge will bring them to a sharp focus. The corrector plate 14 and the mirror 16 together form a primary objective indicated generally at 17. If the distance between the primary objective 17 and the subject of reconnaissance 15 is substantial, as in the case when the earth is reconnoitered from a satellite in orbit, the focus of the radiations will lie approximately in the focal plane of the primary objective 17.

At a point intermediate the reflector 16 and the focal plane of the primary objective 17, a diagonally oriented visual reflecting infrared transmitting member 18 is placed for the purpose of separating the visual component of the admitted radiations from the infrared component. The member 18 is transparent to infrared radiations with the result that the radiations pass through the member 18 and are reflected by an infrared reflecting mirror 19 to form an infrared image upon the entrance 20 of an infrared scanner and sensor 22 to be described in greater detail hereafter. The output of the infrared scanner and sensor 22 is stored by data storage means 24 which may be a suitable magnetic drum or tape storage system, for example.

The diagonal member 18 reflects visual radiations (from which the infrared radiations have been separated) in a direction parallel to the motion of the vehicle. A beam splitter 26 separates the visual radiations into two components having substantially equal intensity. The beam splitter 26 may be a conventional device which transmits approximately half of the visual radiations impinging upon it and reflects the other half. The reflected component is again reflected by a mirror 28 onto any suitable form of image motion compensator device 30, such as an oscillating mirror, which reflects the radiations to a focus at a first entrance 32 of an image transformer device 34. The component which is transmitted by the beam splitter 26 impinges upon a second image motion compensator 36 (which can also be an oscillating mirror) and is reflected to a focus at a second entrance 38 of the image transformer device 34.

The image transformer 34 is a device in which fiber optics are employed to regroup the images focused at the entrances 32 and 38 according to a principle illustrated in FIG. 1, but more fully explained hereinafter, into a form which greatly increases the resolving power of the electronic reconnaissance system.

Segmented images at the exits 40 and 42 of the image transformer 34 are focused by relay lenses 44 and 46, respectively, to form images upon a pair of photosensitive devices, such as the photocathodes of the image orthicon tubes 48 and 50, respectively. The outputs of the image orthicon tubes 48 and 50 are fed into the data storage system 24 where they are stored simultaneously with the information from the infrared scanner and sensor 22. A transmitter 52 of any suitable type transmits the stored information at a convenient time to a remotely located receiving station.

The output of a synchronous generator 54, which receives an input from the data storage system 24, is supplied to the image orthicon tubes 48 and 50 in order to synchronize their rates of scan.

The oscillations of the image motion compensators 30 and 36 are about axes normal to the velocity of the vehicle and 180° out of phase with each other so that images at the entrances 32 and 38 of the image transformer 34 are alternately immobilized. That is, when the direction of rotation of one of the image motion compensating mirrors is such as to immobilize an image at one entrance to the image transformer 34, the direction of oscillation of the other image motion compensating mirror is such as to cause the image formed in the vicinity of the other entrance to move more rapidly with respect thereto than it would move if the latter image motion compensating mirror did not oscillate at all.

The image motion compensators 30 and 36 may comprise conventional vibration galvanometers of the type in which a mirror is mounted on conductors disposed in a static magnetic field and carrying alternating current of appropriate frequency. The alternating current may be supplied by an oscillator 30a connected in opposite phase to the compensators 30 and 36 so as to cause the latter to oscillate in the proper out of phase relation.

The frequency at which the image motion compensators 30 and 36 should oscillate to immobilize the images is directly proportional to the velocity of the vehicle and inversely proportional to its distance from the subject of reconnaissance. For example, if the apparatus is designed so that the sine or tangent of the angle subtended from the vehicle by the length in the direction of vehicle motion of an imaged ground strip is 0.00015, then for a vehicle velocity of 4.5 miles per second and altitude of 300 miles, the oscillation of each two mirrors working together must be at a frequency of approximately 50 cycles per second (thus covering 100 strips per second) in order to provide uninterrupted reconnaissance of successive ground strips. The oscillator 30a may be automatically maintained at the proper frequency, as by adjustment of a resonant circuit element therein as a function of velocity and height information supplied by a velocity and height computer 56 which may be of any known construction.

The velocity and height information is also supplied by the computer 56 to the data storage device 24, so that the information from the image orthicon tubes 48 and 50 and the infrared scanner and sensor 22 will be recorded at a rate commensurate with the rate of reconnaissance of the equipment.

The infrared scanner and sensor 22 (FIGS. 1 and 2) comprises a plurality of photoconductive detectors 57 disposed to receive the infrared line image from the mirror 19. The infrared light preferably is periodically intercepted at a frequency of, say 180 cycles per second by a conventional chopper device 58 powered in any suitable manner (not shown). The detectors 57 supply outputs to a plurality of amplifiers 59, respectively, which are repeatedly connected in succession by an electronic switch or commutator 60 to a line 61 leading to the data storage device 24. Preferably, the electronic switch 60 is synchronized with the oscillator 30a (FIG. 1) so that the scanning operation effected by the detectors 57 will be related to the motions of the image compensating mirrors 30 and 36.

The output from the infrared scanner and sensor 22 can be recorded by the data storage device at locations corresponding to periodic blanking intervals between recorded portions representing the signals from the image orthicon tubes 48 and 50. In this way, infrared positional data can be recorded without obscuring pictorial detail in the record representing the image orthicon responses.

With a high resolution optical system, the stationary images alternatively formed at the entrances 32 and 38 of the image transformer 34 may have as many as 10,560 picture elements in a single scanning line. It is obviously impracticable to put into orbit an image orthicon tube or like scanning device with sufficient resolving power to detect 10,560 bits of information in a single line. It is the purpose of the image transformer 34, accordingly, to rearrange the information into a form such that an electronic picture scanning device such as an image orthicon tube of relatively low resolving power can detect each of the picture elements represented by the images at the entrances 32 and 38.

Figures 2, 3:
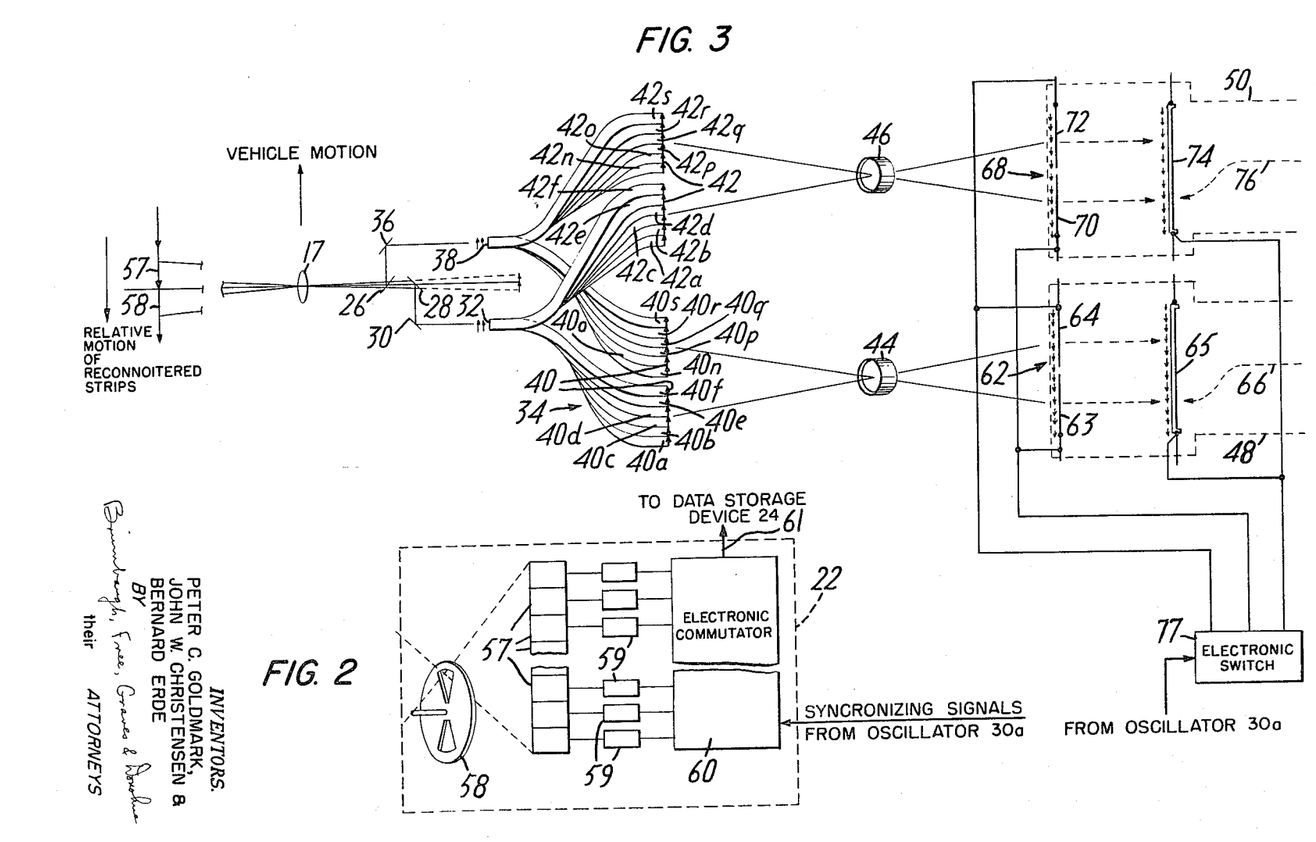
FIG. 2 illustrates schematically the infrared scanner and sensor in the apparatus shown in FIG. 1.
FIG. 3 is a schematic diagram of optical image forming and electronic scanning equipment of the type embodied in the reconnaissance system shown in FIG. 1.
Figure 4:
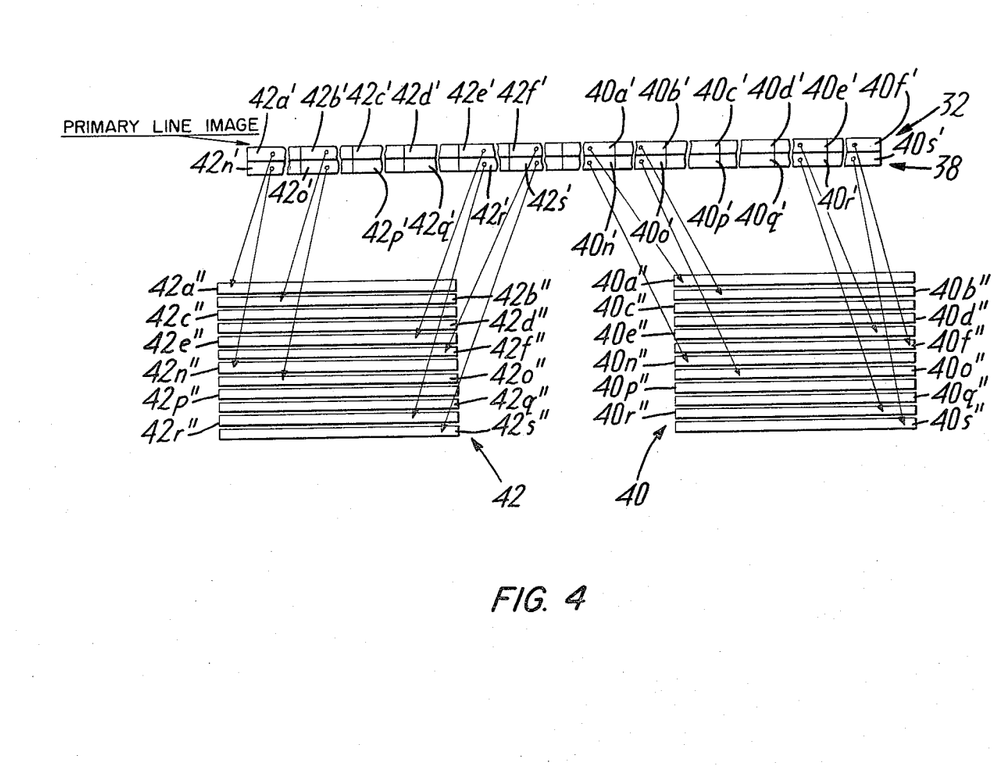
FIG. 4 illustrates schematically the relation between the inputs and the outputs of the image transformer in the apparatus of FIG. 2.

Specifically, the image transformer 34 divides the line images produced at the entrances 32 and 38 into a plurality of line image segments and rearranges them in substantially rectangular arrays for scanning by the image orthicon tubes 48 and 50. Division and rearrangement of the line image at the entrance 32 are effected by a plurality of bundles of fiber optics 40a–40f, inclusive, and 42a–42f, inclusive (FIG. 3). These bundles have entrance portions 40a'–40f', inclusive, and 42a'–42f', inclusive, disposed in side-by-side relation as shown in FIG. 4 to receive adjacent segmental portions of the line image at the image transformer entrance 32. The bundles 40a–40f, inclusive, have exit portions 40a"–40f", respectively, disposed in parallel stacked relation as shown in FIG. 4 and forming a substantially rectangular array at the exit 40. Similarly, the bundles 42a–42f, inclusive, have exit portions 42a"–42f", respectively, disposed in parallel stacked relation and forming a substantially rectangular array at the exit 42.

Division and rearrangement of the line image at the entrance 38 are effected by a second plurality of bundles of fiber optics 40n–40s, inclusive, and 42n–42s, inclusive, having entrance portions 40n'–40s' and 42n'–42s', and exit portions 40n"–40s" and 42n"–42s" similarly arranged as indicated in FIG. 4.

The optical fiber elements of which the image transformer 34 is constructed may be made of any suitable transparent material such as glass, and they are preferably each coated with a transparent material having a lower index of refraction, which may also be glass. In order to prevent any loss in resolution as a result of gross quantizing of information, the transverse dimension of each fiber element should be less than the size of a picture element. Thus, in a practical system, nine optical fibers may be provided for each picture element.

It will be understood that the primary line image of a reconnoitered strip is divided by the image transformer 34 into 12 segments, of which six are stored on the image orthicon 48 in parallel stacked relation and six on the image orthicon 50. Each image orthicon also stores six segments of the line image of the next following strip, below the stacked six segments of the first line image. Twelve line segments are, therefore, imaged on each image orthicon.

If each line image segment contains, say 880 picture elements along its length and is, say, 52 lines deep, it will contain a total of 45,760 picture elements. Each of the image orthicons 48 and 50, therefore, will be called upon to store, for the 12 line image segments, a total of 549,120 optical picture elements. Further, if each line image segment stored by the image orthicons is scanned by 74 active scanning lines (using a Kell factor of 0.7) and 9 more scanning lines per segment cover an inactive blanked area between the segments, there will be 888 active scanning lines and 144 blanked scanning lines covering the area used on the image orthicon photocathode, a total of 1,032 scanning lines.

For the values specified above, the size of each of the fiber optics exit portions 40a"–40f" and 40n"–40s" will be 0.528 inch wide and 0.0311 inch deep. Twelve of them will occupy a space 0.3733 inch deep. If the total blanked space between segments is 0.0346 inch, and the separation between the exit portions is 0.0227 inch, the fiber optics exit portions 40a"–40f" and 40n"–40s" will occupy an area 0.528 inch wide by 0.430 inch deep and having a diagonal of 0.681 inch. Similarly, the fiber optics exit portions 42a"–42f" and 42n"–42s" will occupy a like area.

If the useful diagonal on the photocathodes of the image orthicon is, say, 1.8 inch, the lenses 44 and 46 should each have a magnification factor of about 2.64. In such case, the area occupied on the photocathodes of each of the image orthicons will be 1.40 inches wide by 1.14 inches high.

It will be understood that the values suggested above are merely exemplary and that other values may be used depending upon the results desired.

As best shown in FIG. 3, the relay lens 44 forms an image of the segmented image at the exit 40 upon the photocathode 62 of the image orthicon 48. The photocathode 62 is divided into two slightly separated portions 63 and 64. The image segments appearing at the exit portions 40a" through 40f" are imaged on the portion 64, and the image segments appearing at the exit portions 40n" through 40s" are imaged upon the portion 63 of the photocathode 62. The photocathode 62 is photoemissive and causes electronic bombardment of a target 65, while a scanning beam 66 scans the target in the usual manner.

The relay lens 46 forms an image of the image segments appearing at the exit portions 42a"–42f" on a portion 72 of a photocathode 68 of the image orthicon 50 and an image of the image segments appearing at the exit portions 42n"–42s" on a separate portion 70 of the photocathode 68. The photocathode 68 is likewise photoemissive and causes electron images to be formed on a target 74 which are scanned by a scanning beam 76.

As stated above, it is necessary to provide means for transmitting an output from the half of each photocathode of the image orthicons 48 and 50 which at a particular moment is receiving a charge corresponding to the line image immobilized by one of the line image motion compensating mirrors, while at the same time blocking transmission of an output from the other half of each photocathode. Suitable means may comprise, for example, a blank signal generator 77 (FIG. 1) connected to receive synchronizing signals from the oscillator 30a (FIG. 1) which drives the oscillating mirrors 30 and 36, and to provide blanking signals to the photocathode portions 63 and 70, and other blanking signals to the photocathode portions 64 and 72.

Figure 5A:
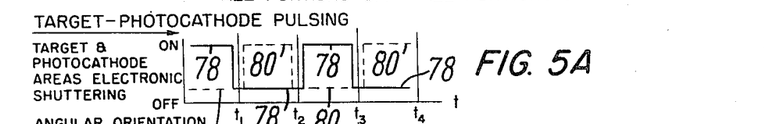
FIGS. 5A through 5D are a set of time sequence curves showing the timing relationships among several of the components of the apparatus depicted in FIG. 1.

FIG. 5A shows the shape of two waveforms 78 and 80 simultaneously generated by the signal generator 77, which are of such a form and so phased with respect to each other that at least one-half of each photocathode is always rendered nonemissive, and during a small fraction of a cycle both halves of both photocathodes are nonemissive. The waveform 78 governs the action of the portions 64 and 72 of the photocathodes 62 and 68 and the waveform 80 governs the action of the portions 63 and 70 of the photocathodes 62 and 68.

Figure 5B:
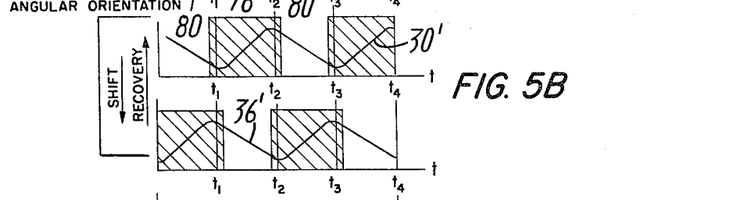

FIG. 5B shows the oscillatory movement of the image motion compensating mirrors 30 and 36 in relation to the blanking of the image orthicon photocathodes. It will be observed that at the left-hand of FIG. 5B, the image motion compensator mirror 30 is oscillating in a way defined by a curve 30' so as to immobilize an image at the entrance 32 (FIGS. 1 and 2) of the image transformer 34. Simultaneously, the image motion compensating mirror 36 is recovering from its previous movement as defined by a curve 36' so as to regain position for immobilizing the following strip of the reconnoitered subject.

The waveform 78 (FIG. 5A) activates the portions 64 and 72 of the photocathodes as the image motion compensating mirror 30 is moving so as to immobilize an image at the entrance 32 (FIGS. 1 and 2) of the image transformer 34. Likewise, during the following cycle, when the following image strips is being immobilized by the image motion compensating mirror 36 at the entrance 38 of the image transformer 34, the waveform 80 has rendered the portions 63 and 70 emissive, and the waveform 78 has rendered the portions 64 and 72 nonemissive.

It will also be observed that there is a period near the time when the image motion compensating mirrors 30 and 36 are changing direction where the waveforms 78 and 80 have rendered all four portions of the photocathodes 62 and 68 nonemissive.

Figures 5C, 5D:
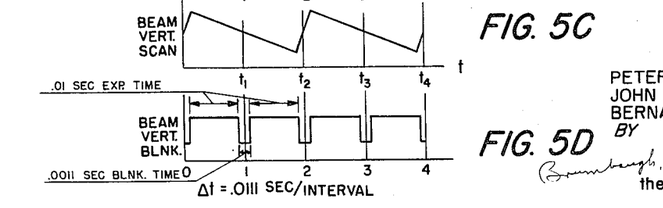

FIG. 5C shows the relationship of the vertical beam scans in the image orthicon tubes 48 and 50 to the motion of the image motion compensating mirrors 30 and 36 and to the waveforms 78 and 80. The read-out of the electron image charges on both areas of each image orthicon target is accomplished during two successive intervals with the timing such that the read-out takes place only in darkness (i.e., when the corresponding photocathode is nonemissive). The beam vertical blanking is made to coincide with the scanning retrace from the bottom of the portion 63 or 70 to the top of the portion 64 or 72, and also to cover the transition from the portion 64 or 72 to the portion 63 or 70.

FIG. 5D is a graph showing the times when either of the portion 63 or 64 is on (emissive).

For purposes of illustration, FIGS. 5A through 5D are drawn on a scale on which time is divided into intervals of 0.0111 second. At a height of 300 miles and a velocity of 4.41 miles per second, this is the time which would be required for an image of a reconnoitered strip to move its own length (in the direction of its relative motion) across an image transformer entrance. This value of transit time is derived from the desideratum that the actual exposure time be made the maximum possible, or about 0.01 second and the change-over time be limited to the remaining 10% of the transit time, or 0.00111 second.

In the electronic shuttering curve of FIG. 5A is shown the alternating on-off pulsing of the two portions of the photocathode of each image orthicon by means of rectangular waveforms. During 90% of the period, one portion is "on" (emissive) and the other portion is "off" (blocked). During 90% of the following period, the portion which was previously "on" is "off" and vice versa. During 10% of each period, the pulses overlap so that both portions are off and there is no formation of image "charge" on the target. This is the change-over period during which the image motion compensating mirrors are changing directions in their upward and downward excursions.

Figure 6:
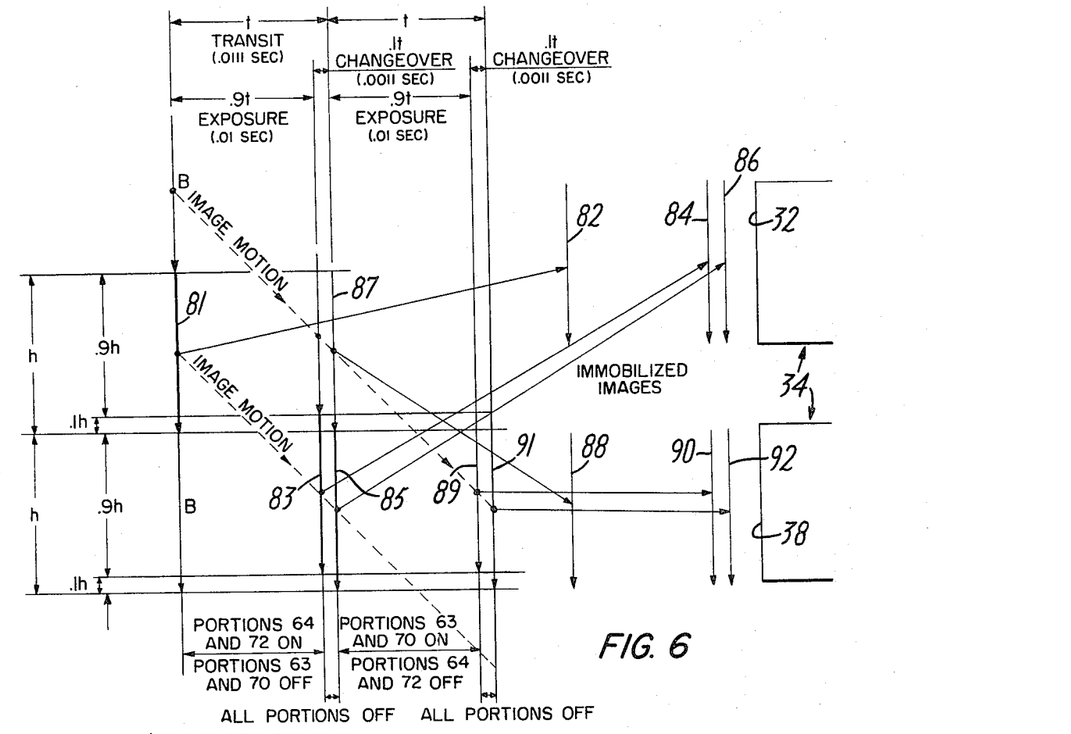
FIG. 6 is a diagram of typical image positions at the entrances of the image transformer devices as a function of time during the optical image motion compensating cycle, showing the alternate immobilizing of the images despite the continuous relative motion of the apparatus with respect to the subject of reconnaissance.

FIG. 6, like FIGS. 5A through 5D, contains a horizontal time scale divided into intervals of 0.0111 second. Consider an image element which at the start of a cycle would be at position 81, were it not for the image motion compensation apparatus and which is in fact at position 82 because of the action of that apparatus. Inasmuch as in time $t$ the element moves its height $h$, after 0.9 time $t$ the element would be in position 83 were it not for image motion compensation. However, because of the image motion compensation, it is at 84. In the remaining 0.1 $t$, the element would move the remaining 0.1 $h$ to position 85 in the absence of image motion compensation, but because of the image motion compensation it is imaged at position 86. It is obvious that positions 82, 84 and 86 are the same in reality (i.e., where the time dimension is not represented spatially as in FIG. 6).

During this period $t$, although a moving image of successive portions of the reconnoitered subject has been formed by the recovering image motion compensating mirror 36 at the entrance 38, the photocathode portions 63 and 70 have been pulsed to the "off" position and the electron image has been blocked. At the start of the next cycle, an immediately following reconnoitered strip would now in the absence of image motion compensation be in position 87 formerly occupied by the previous reconnoitered strip but is immobilized by the image motion compensating mirror 36 at 88. Then, while the element moves 0.9 of its height $h$ from 87 to 89 in 0.9 $t$, it is immobilized by the image motion compensating mirror 36 at 90. In the remaining 0.1 $t$, when it would in the absence of image motion compensation move the remaining 0.1 $t$ from 89 to 91, it moves from 90 to 92 to complete the cycle.

It will be understood that the positions 82, 84 and 86 coincide with each other and are at the image transformer entrance 32 (FIGS. 1 and 2), while the positions 88, 90 and 92 coincide with each other and are at the image transformer entrance 38.

At the bottom of FIG. 6 there is shown the related photocathode pulsing sequence. While an image of the first strip is being immobilized, the portions 64 and 72 are on, and the portions 63 and 70 are off. Similarly, while the second image strip is being immobilized, the portions 63 and 70 are on and the portions 64 and 72 are off. During the 0.1 $t$ change-over period, all four of the portions 63, 64, 70 and 72 are off.

It is evident that there is thus no gap in the reconnaissance. Further, the time-sharing by the two image motion compensating mirrors means that their oscillatory movements can be made relatively gentle, thus reducing the acceleration forces at the turn-around.

Figure 7:
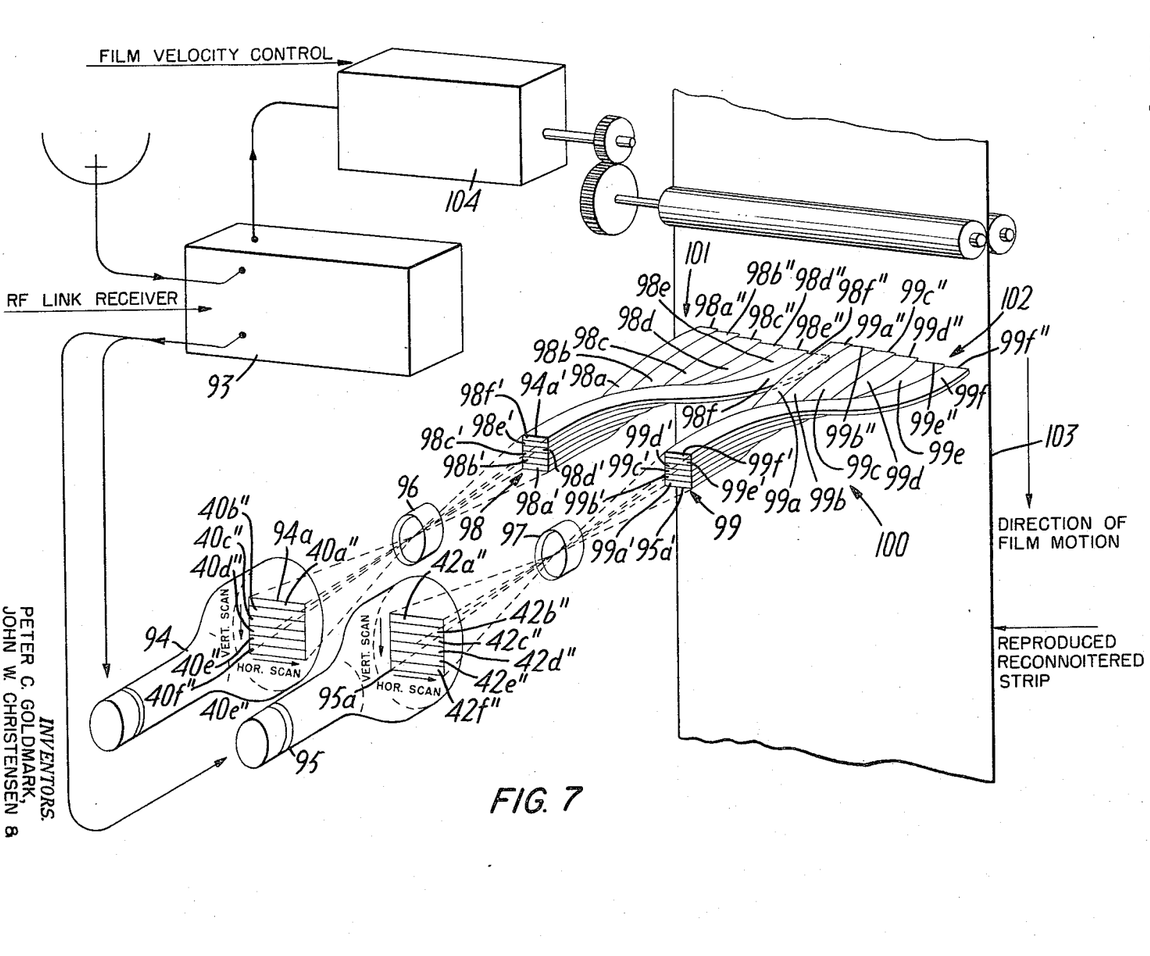
FIG. 7 is a schematic diagram of a typical remote receiving station according to the invention.

FIG. 7 is a schematic diagram of typical apparatus for reproducing at a remote station which may conveniently be located on the ground, the reconnaissance information obtained by apparatus of the type shown in FIGS. 1 and 2. The signals received by an RF link receiver 93 from the transmitter 52 in FIG. 1 are fed to two flying spot cathode ray tubes 94 and 95 and are reproduced there as raster scans, each one containing segmented information corresponding to a five mile ground strip, assuming the velocity and height parameters referred to above. The cathode ray tube rasters 94a and 95a are projected by lenses 96 and 97, respectively, to the entrances 98 and 99, respectively, of an image transformer device 100 which is similar to the image transformer 34 in FIG. 1. The entrances to the image transformer 100 are stacked vertically and the exits 101 and 102 are arranged substantially horizontally as shown. See also FIG. 8.

Figure 8:
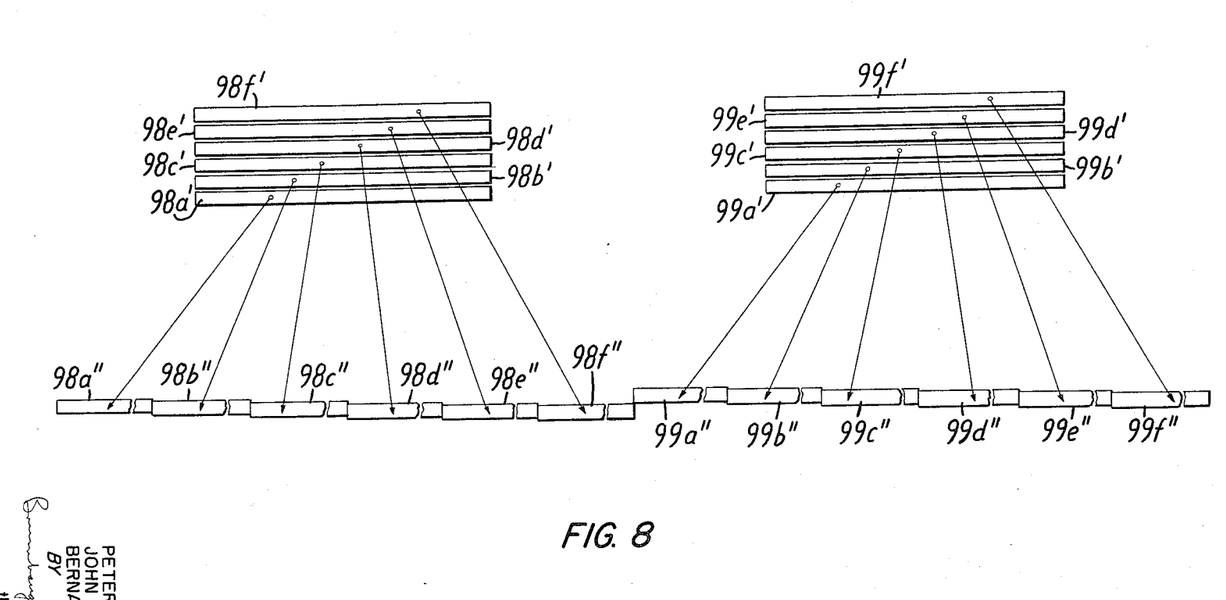
FIG. 8 is a representation of the relation between the entrances and the exits of the image transformer at the remote reproducing station in FIG. 7.

The image transformer 100 comprises a plurality of bundles of fiber optics 98a–98f and 99a–99f, inclusive. The bundles 98a–98f, inclusive, have entrance portions 98a'–98f' disposed in stacked array and defining a surface on which the raster on the screen of the cathode ray tube 94 is imaged, and exit portions 98a''–98f''. The exit portions 98a''–98f'' are disposed side by side in substantially linear array adjacent and transversely of a film strip 103. The film strip 103 is driven at a speed synchronized with the scanning rate of the cathode ray tubes 94 and 95 by suitable drive mechanism 104 responsive to control signals from the receiver 93. Each of the exit portions 98a''–98f'' is slightly displaced from the one on its left in the direction of motion of the film strip 103 as shown in FIGS. 7 and 8.

Similarly, the bundles 99a–99f have entrance portions 99a'–99f' and exit portions 99a''–99f'', respectively. The entrance portions 99a'–99f' are disposed in stacked array and define a surface on which the raster on the screen of the cathode ray tube 95 is imaged. The exit portions 99a''–99f'' lie side by side in substantially linear array adjacent and transversely of the record strip 103, slightly displaced the same amounts as the exit portions 98a''–98f'', respectively, in the direction of motion of the film strip 103.

For purposes of illustration, the film 103 is shown as moving toward the bottom of FIG. 7. The direction of vertical scan in the image transformer exits 101 and 102 is then toward the top of the figure. Therefore, the effective vertical scan on the film 103 is the resultant of the downward motion of the film 103 and the upward motions of the vertical scan effected by the images of scanning spots on the screen of the cathode ray tubes 94 and 95. Preferably, the respective film and scanning spot velocities are such that as the vertical scan moves upwardly in time $t/6$ (the same time $t$ referred to above in conjunction with FIGS. 5A through 5D and FIG. 6) past a line image segment and the spacing between it and the next line image segment, the film moves downward for one-sixth of its own resultant scan height. Accordingly, after a period $t$, the film will have moved a distance equal to its own resultant scanned height, the vertical scan will have traversed 12 line image segments (six in each raster on the screens of the cathode ray tubes 94 and 95) and another film scan cycle is ready to start.

Figure 9A:
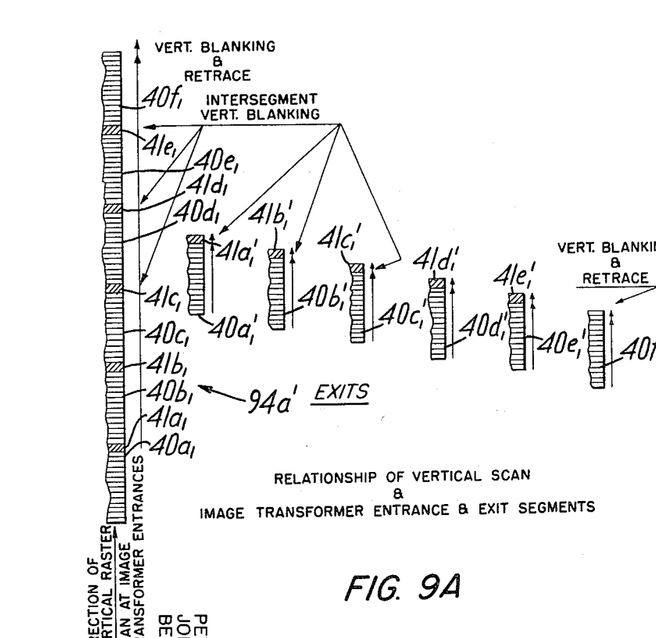
FIG. 9A is a diagram showing the relationship between the vertical scan and the entrance and exit segments.
Figure 9B:
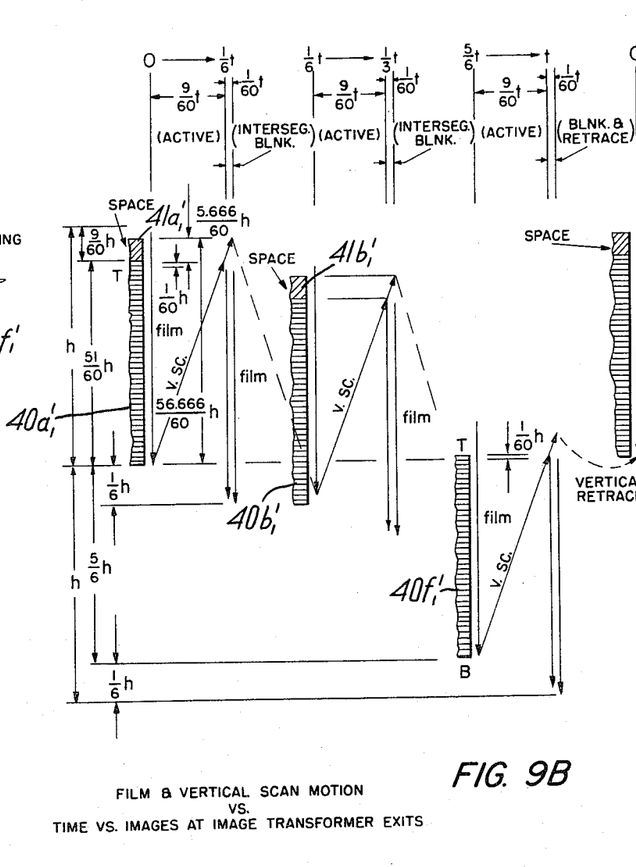
FIG. 9B is a diagram representing the vertical scanning motion as a function of time with respect to the fixed segment exits.

The sequence of events in the ground recording cycle is depicted by FIGS. 9A and 9B. FIG. 9A shows the relationship between the vertical scan effected by the cathode ray tubes 94 and 95 and the entrances 98 and 99 and exits 101 and 102 of the image transformer 100. FIG. 9B illustrates the film and vertical scan motions as functions of time with respect to the fixed segment exits.

As shown in FIG. 7, the image 94a' of the raster 94a on the screen of the cathode ray tube 94, for example, is in exact registry with the entrance 98 of the image transformer 100. As further shown in FIG. 9A, the image 94a' comprises a plurality of line segments $40a_1$–$40f_1$, corresponding to the line segments transmitted by the bundles 40a–40f in FIG. 2, with a plurality of blanking intervals $41a_1$–$41e_1$, therebetween. As indicated above, the vertical scan is from the bottom of the image 94a' to the top, vertical blanking and retrace being effected immediately after the line image segment $40f_1$.

Each line image segment and the blanking interval immediately following is in exact registry with a different one of the fiber optics entrance portions 98a'–98f' comprising the entrance 98 to the image transformer 100. The latter serves to rearrange the line image segments into a downwardly sloping linear array, each line image portion and its following blanking interval being in exact registry with one of the image transformer exits 98a''–98f'', with the blanking intervals at the top, as shown in FIG. 9A.

Similar conditions prevail for the image 95a' of the raster 95a on the screen of the cathode ray tube 95 with respect to the entrance portions 99a'–99f' and exit portions 99a''–99f'' of the image transformer 100.

In order to insure continuous reconnaissance with no gaps resulting from blanking requirements, it is necessary that predetermined relations be maintained. Since the film 103 is driven downwardly at a constant velocity synchronized with the scanning rate and the direction of vertical scan in the image transformer exit portions 98a''–98f'' and 99a''–99f'' is upward, the effective vertical scan on the film 103 is the resultant of these two motions. The respective film and scan velocity amplitudes should be such that as the vertical scan moves upwardly in time $t/6$ past a line image segment and its following spacing distance, the film 103 will move downwardly for ⅙ of its own resultant scanned height. Under these conditions, after a period of $t$, the film 103 will have moved a distance equivalent to its own resultant scanned height, the vertical scan will have traversed all six line image segments and another film scan cycle will be ready to start.

In FIG. 9B, the height of the strip across the film 103 which is to record one complete read-out from the image transformer exits 101 and 102 in time $t$ is designated $h$ (in a typical embodiment this distance may be, say, 0.03663 inch); that is, the film is exposed across its width and along a height $h$ in time $t$, which is the total time required for making the 12 line segment scans, two at a time. Accordingly, the film is exposed across the width of two segments and along a height $h$ in time $t/6$. In order to accomplish this, the scan moves up $51/60$ of the height $h$ in $9/60$ of the time $t$, which is the active or "on" time per line segment scan. In the same time $t$, the film moves down a distance of $9/60$ of the height $h$. In $1/60$ of the time $t$, the film 103 moves down $1/60$ of the height $h$. This latter time is the blanked time per line segment scan.

The vertical scan moves up $5.666/60$ of the height $h$ in time $1/60$ $t$, which is the blanked time per line segment scan, and up $56.666/60$ of the height $h$ in time $1/6$ $t$, which is the total time per line segment scan.

The active height of the recorded line segment is $51/60$ of the height $h$ (0.0311 inch for the value of $h$ assumed above), and the blanked height is $5.666/60$ of the height $h$ (0.0035 inch). Therefore, the active plus blanked height of a segment is $56.666/60$ of the height $h$, or 0.0346 inch.

The vertical displacement of one line image segment with respect to the next is $1/6$ of the height $h$, and there is an overlap of the active heights of the first and last segments $40a_1'$ and $40f_1'$, respectively, of $1/60$ of the height $h$ ($1/51$ of the active segment height, or 0.0006 inch). For the illustrative conditions described above, the total raster scan time $t$ is assumed to be 0.0111 second and the recording film velocity may be, say, 3.30 inches per second.

In operation of the ground recording station shown in FIG. 7, the link receiver 93 supplies signals to modulate the intensities of the electron beams in the cathode ray tubes 94 and 95 to form the rasters 94a and 95a, respectively, on the phosphor screens thereof. The signals thus supplied are such that the raster 94a corresponds to the first six line image segments in a given line while the raster 95a corresponds to the last six image segments in the same line. The horizontal and vertical motions of the scanning beams in the cathode ray tubes 94 and 95 are synchronized so that the two groups of six line image segments are recorded on the film in successive pairs, each pair including a line image segment in one group and the corresponding line image segment in the other group. In this fashion, an accurate reproduction of the information originally reconnoitered by the apparatus shown in FIGS. 1 and 2 can readily be obtained.

Figure 10:
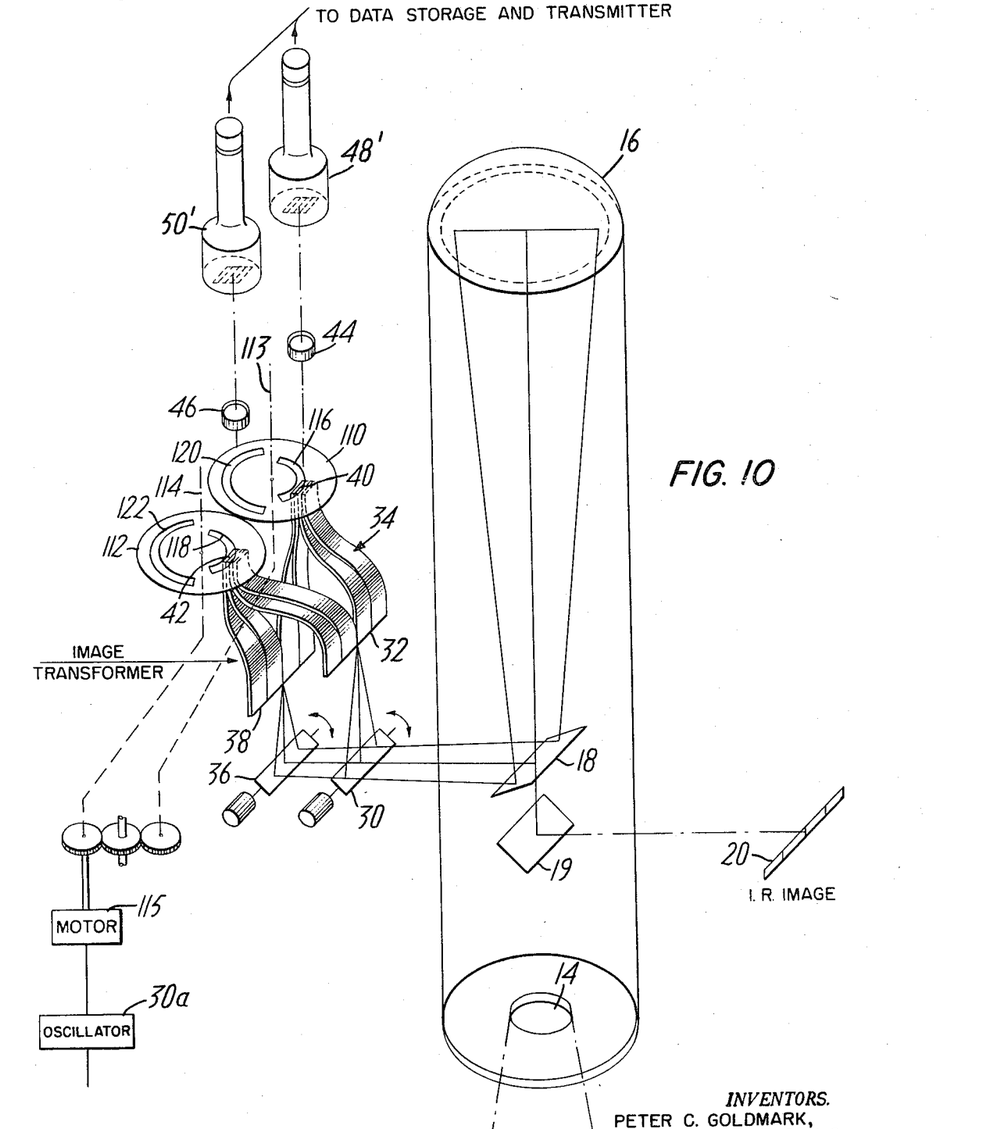
FIG. 10 is an alternate embodiment of the apparatus shown in FIG. 1 with mechanical shuttering instead of electronic shuttering.

FIG. 10 shows an alternate embodiment of transmitting equipment in which conventional image orthicon tubes and mechanical shuttering means are employed instead of the double cathode image orthicon tubes shown in FIG. 1. The beam splitter 26 and the mirror 28 of FIG. 1 are not used in the embodiment shown in FIG. 10, although they are adaptable for such use, if desired. The image motion compensating mirror 30 serves also as a beam splitter in FIG. 10, transmitting approximately half of the incident radiant energy and reflecting the other half. The image transformer 34 of FIG. 10 is identical to that of FIG. 1, and the relay lenses 44 and 46 are also identical to the relay lenses of FIG. 1. However, the image orthicons 48' and 50' of FIG. 10 are conventional. Accordingly, electronic shuttering is not available as a means of allowing transmission of an image corresponding to one reconnoitered strip while blocking transmission of an image corresponding to another strip on the same photocathode. Inasmuch as the shuttering speeds are of the order of 50 cycles per second, it is feasible to employ mechanical shutter means for this purpose.

To this end, shutter discs 110 and 112, which rotate in a plane parallel to the plane of the image transformer exits 40 and 42 about axes 113 and 114, respectively, normal to those planes, are employed. The discs may be driven by suitable motive means 115 synchronized with the oscillator 30a (FIG. 1) which controls the oscillations of the mirrors 36 and 30. The discs contain substantially semicircular slots 116 and 118, respectively, concentric with respect to the axes 113 and 114, and of such a radius and radial width as, when properly oriented, to expose the portions of the exits 40 and 42, respectively, which correspond to the immobilized image at the image transformer entrance 38.

Similarly the discs 110 and 112 are provided with semicircular slots 120 and 122, respectively, also concentric with respect to the axis 113 and 114, and having a larger radius of curvature such that when the discs 110 and 112 are properly oriented, the slots 120 and 122 will expose the portions of the exits 40 and 42, respectively, which correspond to the immobilized image at the image transformer entrance 32. The slots 116 and 118 extend through an angle of, say 162°, and the slots 120 and 122 also extend through an angle of, any 162° directly opposite the slots 116 and 118. Accordingly, for a given cycle extending through time as defined above, the image orthicons 50' and 48' will be "on" 90% of the time and "off" the remaining 10%, as in the case where split cathode image orthicons and electronic shuttering are used.

Figures 11, 12:
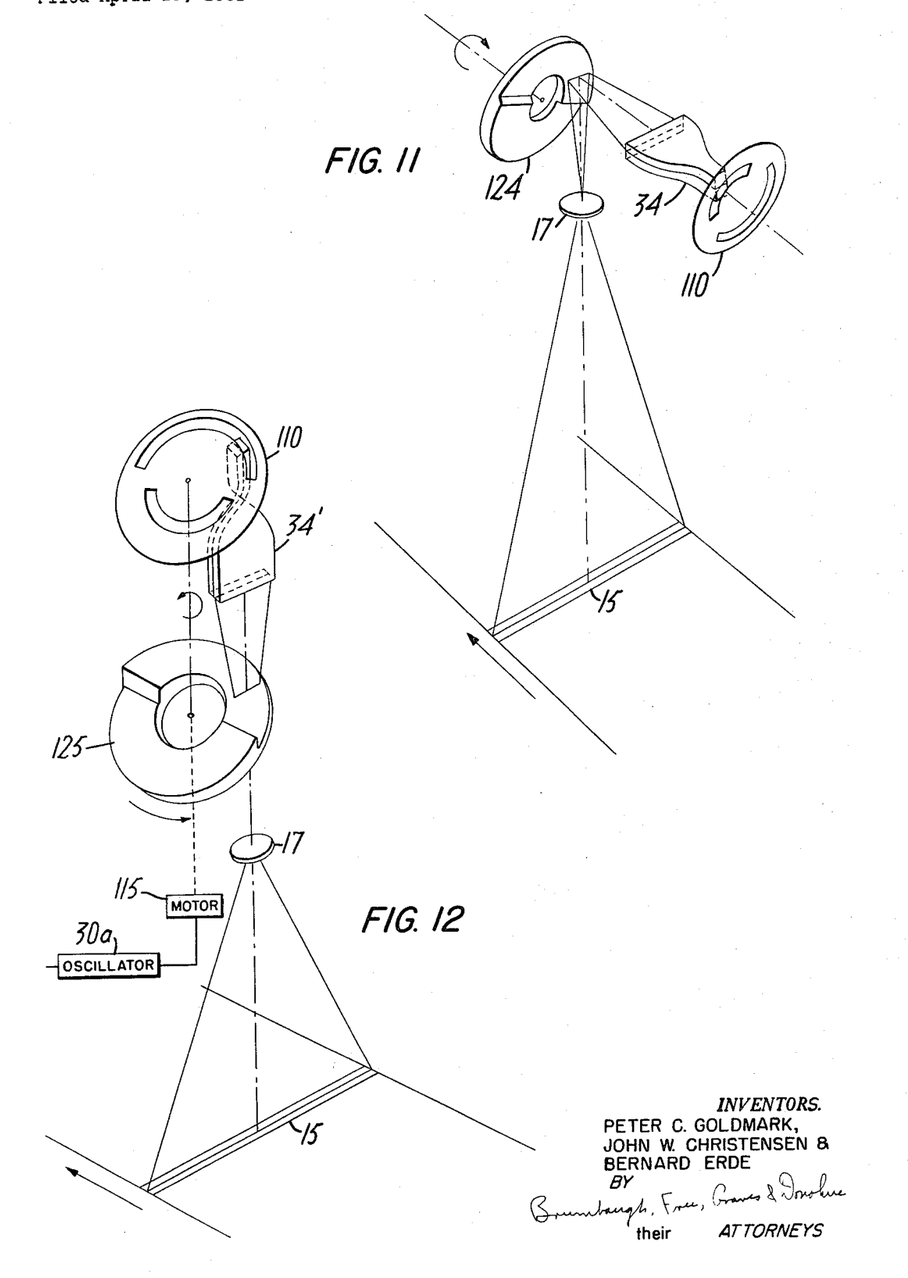
FIG. 11 is an alternate embodiment of an image motion compensator, consisting of a rotating reflecting wedge.
FIG. 12 is another alternate embodiment of an image motion compensator consisting of a rotating refracting wedge.

FIG. 11 shows an alternate embodiment of an image motion compensator that may be used instead of the oscillating mirrors 36 and 30 in FIGS. 1 and 11. A reflecting circular wedge 124 reflects radiations directed thereto by the primary objective 17. The wedge 124 may be driven in any suitable manner, as by the motor 115 in FIG. 1 which is synchronized with the oscillator 30a. The angle of incidence of impinging radiations remains uniform as the wedge 124 rotates, but the point at which reflection occurs changes constantly so that there is a displacement of the reflected image with respect to the image transformer 34. If the angle of incidence, the steepness of the wedge, and the speed of its rotation are properly chosen with respect to the height and velocity of the vehicle, it will be understood that the moving images from the primary objective 17 will be immobilized substantially as described above in connection with FIG. 1.

FIG. 12 shows a refracting circular wedge 125 which may be used for the same purpose. Inasmuch as the lower and upper faces of the wedge are plane surfaces, the angle of refraction of a ray of light will be the same regardless of where it enters the wedge 125. Likewise, the angle of refraction of the ray will be the same regardless of the point on the upper face at which it leaves the refracting wedge 125. Accordingly, the rays of light which leave the refracting wedge 125 will be parallel. However, since the rays near the thin end of the wedge will not travel as far in the wedge as the rays which enter near the thick end of the wedge, the former will be refracted more quickly than the latter, and will be displaced from the latter. Accordingly, if the parameters discussed in connection with FIG. 11 are properly chosen, the apparatus of FIG. 12 will likewise function effectively as an image motion compensator.

Figure 13:
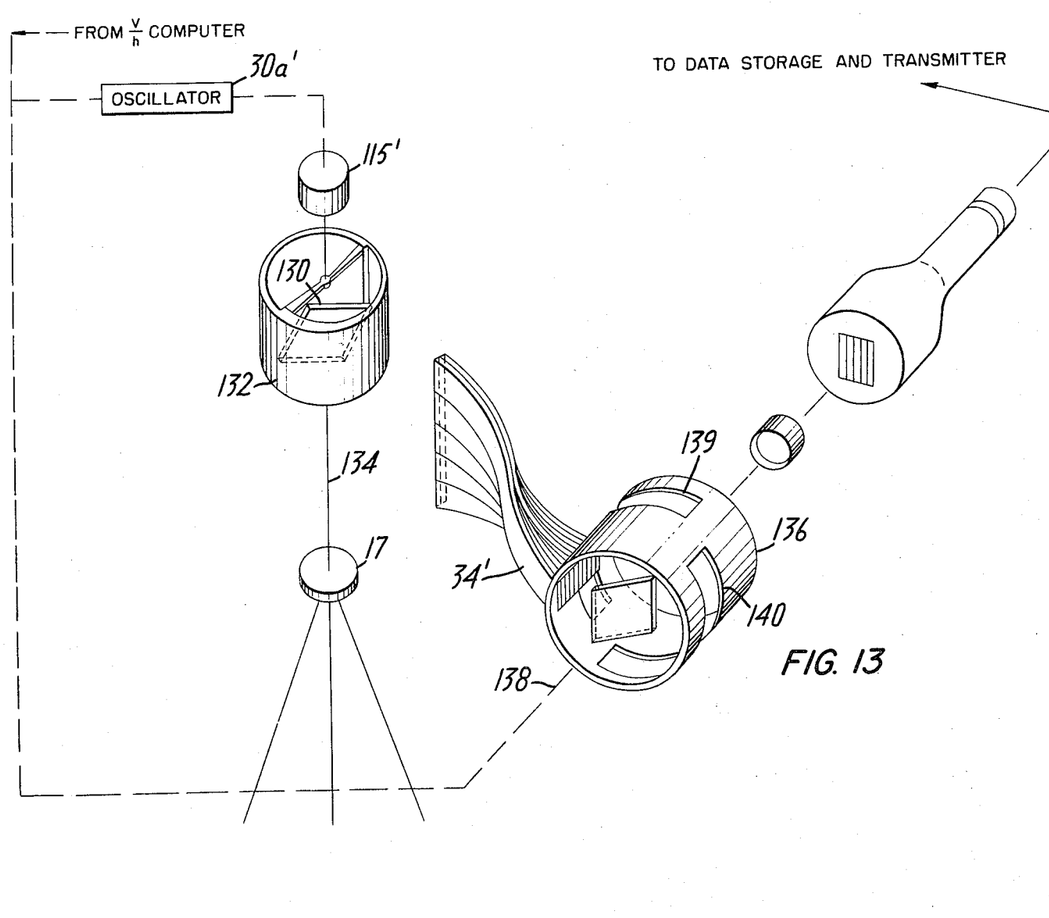
FIG. 13 shows a further embodiment of the invention.

FIG. 13 shows still another embodiment of a means for applying image motion compensation to one or more conventional or split-cathode image orthicons by means of a refracting cylindrical drum. A mirror 130 within a rotatable drum 132 is disposed at such an angle with respect to the axis 134 of the drum 132 as to reflect radiations transmitted by the primary objective 17 to a focus at the entrance to an image transformer 34'. The drum 132 is connected to be rotated by the motor 115' which is synchronized with the oscillator 30a'. The thickness of the peripheral wall of the drum 132 is varied in the same manner as the thickness of the refracting circular wedge, and the drum 132 operates in the same manner to immobilize an image at the entrance to the image transformer 34'.

A second drum 136, also driven by the motor 115', by mechanical linkage not illustrated, rotates about an axis 138 with its peripheral wall adjacent to the exit of the image transformer 34'. Slits 139 and 140 on the peripheral wall of the drum 136 may be used as a shutter device as an alternate to the disc shutter previously described. The slits 139 and 140 extend around mutually exclusive 162 degree arcs of the peripheral wall of the drum 136, so that, as before, an image orthicon will be "on" 90% of the time, and "off" the remaining 10%.

It will be understood that a shutter of this character is not necessary where a split-cathode image orthicon is employed with electronic shuttering.

Thus, there is provided in accordance with the present invention, an electronic reconnaissance system of a size suitable for use in conjunction with artificial satellites of the earth and having a resolving power limited only by that of the optical equipment incorporated in the system.

While several specific embodiments have been described above, it will be understood that the invention is not limited thereto. A wide range of modifications is possible within the scope of the invention, as will be apparent to those skilled in the art. For example, other forms of photosensitive scanning devices than image orthicon tubes may be used and image immobilization may be effected in ways other than those shown herein by way of illustration. Also, various known techniques such as the conventional television practice known as "crispening" may be employed to improve the quality of the final reproduction, as deemed necessary or desirable. Accordingly, the invention is intended to encompass all such modifications and variations as come within the scope of the following claims.

We claim:

1. In reconnaissance apparatus, the combination of first optical means for viewing an area to be reconnoitered which is in relative motion thereto and for producing images of successive strips of said area, first means operated in timed relation to said relative motion for immobilizing certain of said strip images, second means operated in timed relation to said relative motion for immobilizing others of said strip images, second optical means having first entrance members disposed to view successive portions of one part of one of said certain immobilized strip images and first exit members disposed to exhibit said successive strip image portions in first parallel stacked array, and having second entrance members disposed to view successive portions of one part of one of said other immobilized strip images and second exit members disposed to exhibit said last-named strip images in second parallel stacked array adjacent said first parallel stacked array, and third optical means having third entrance members disposed to view successive portions of another part of said one of said certain immobilized strip images and third exit members disposed to exhibit said last-named successive strip image portions in a third parallel stacked array, and having fourth entrance members disposed to view successive portions of another part of said one of said other immobilized strip images and fourth exit members disposed to exhibit said last-named successive strip image portions in a fourth parallel stacked array adjacent said third parallel stacked array.

2. In reconnaissance apparatus, the combination of first optical means for viewing an area to be reconnoitered which is in relative motion thereto and for producing images of successive strips of said area, first means operated in timed relation to said relative motion for immobilizing certain of said strip images, second means operated in timed relation to said relative motion for immobilizing others of said strip images, first fiber optics means having first entrance members disposed to view successive portions of one part of one of said certain immobilized strip images and first exit members disposed to exhibit said successive strip image portions in first parallel stacked array, and having second entrance members disposed to view successive portions of one part of one of said other immobilized strip images and second exit members disposed to exhibit said last-named strip images in second parallel stacked array adjacent said first parallel stacked array, second fiber optics means having third entrance members disposed to view successive portions of another part of said one of said certain immobilized strip images and third exit members disposed to exhibit said last-named successive strip image portions in a third parallel stacked array, and having fourth entrance members disposed to view successive portions of another part of said one of said other immobilized strip images and fourth exit members disposed to exhibit said last-named successive strip image portions in a fourth parallel stacked array adjacent said third parallel stacked array, first electronic camera means disposed to view said first and third parallel stacked arrays of strip image portions for producing first signals representative thereof, second electronic camera means disposed to view said second and fourth stacked arrays of strip image portions for producing second signals representative thereof, means operated in timed relation to said image immobilizing means for controlling the responses of said first and second electronic camera means, means for recording said first and second signals, means for reproducing said recorded first and second signals, and means for transmitting said reproduced signals to a remote receiving location.

3. In reconnaissance apparatus, the combination of first means for exhibiting a first substantially rectangular image of a first portion of a composite picture, second means for exhibiting a second substantially rectangular image of a second portion of said composite picture, a movable record strip, means for reconstructing said composite picture including first means responsive, respectively, to parallel line segments of said first image for imaging said line segments on said record strip in side by side substantially linear array with each segment displaced from the next in the direction of movement of said record strip, and second means responsive, respectively, to parallel line segments of said second image for imaging said last-named line segments on said record strip in second side by side substantially linear array alongside of said first array with the same displacements of the line segments in the direction of movement of said record strip as for the line segments of said first array, respectively.

4. In reconnaissance apparatus, the combination of first and second cathode ray tubes, first and second means for producing on the faces of said cathode ray tubes first and second rasters, respectively, representing a plurality of successive line image segments in parallel stacked array, a record strip, first image transformer means comprising means forming a first plurality of optical paths, each having an entrance and an exit, said entrances being disposed in parallel stacked array and defining a first image plane and said exits being disposed adjacent said record strip in first side by side substantially linear array transversely thereof with each exit displaced from the next in the direction of movement of said record strip, means for focussing on said first image plane an image of the raster on the face of one of said cathode ray tubes, second image transformer means comprising means forming a second plurality of optical paths, each having an entrance and an exit, said last-named entrances being disposed in parallel stacked array and defining a second image plane and said last-named exists being disposed adjacent said record strip in second side by side substantially linear array alongside said first linear array with each exit displaced from the next in the direction of movement of said record strip in the same manner as the exits of said first linear array, respectively, and means for focussing on said second image plane an image of the raster on the face of the other of said cathode ray tubes.

5. Reconnaissance apparatus as defined in claim 4 together with radio receiver means for receiving radio signals comprising a carrier signal modulated in accordance with line scan video information, means coupled to said receiver means for producing synchronizing signals in timed relation to said video information, means including said first raster producing means and coupled to said synchronizing signal producing means and to said receiver means for reproducing part of said video information by said first raster, means including said second raster producing means and coupled to said synchronizing signal producing means and to said receiver means for reproducing another part of said video information by said second raster, and means coupled to said synchronizing signal generating means for synchronizing the movement of said record strip with said video information.

6. Reconnaissance apparatus as defined in claim 2 in which the means for controlling the responses of the first and second electronic camera means comprises first and second interrupter means interposed between the exit members of said first and second fiber optics means, respectively, and said first and electronic camera means, respectively, and operated in timed relation to said image immobilizing means, said first interrupter means having window portions adapted to expose said first and third parallel stacked arrays of strip images alternately to said first electronic camera means, and said second interrupter means having window portions adapted to expose said second and fourth stacked arrays of strip image portions alternately to said second electronic camera means.

7. In reconnaissance apparatus, the combination of first optical means for viewing an area to be reconnoitered which is in relative motion thereto and for forming a moving visual line image of a portion thereof, means for immobilizing the moving visual line image, image transformer means disposed to receive a portion of said immobilized visual line image for separating said portion into series of line segments and for rearranging said segments into an image array in which the line segments are in stacked parallel relation, and electronic camera means disposed to receive said array on the face thereof for scanning the segments of said image array at a given rate to develop corresponding electrical video signals.

8. Apparatus in accordance with claim 7, further comprising means for producing and immobilizing a successive visual line image of a successive portion of the area to be reconnoitered, second image transformer means disposed to receive a portion of the successive visual line image for separating the portion of the successive line image into a second series of line segments and for rearranging the segments of said second series into a second image array in which the segments are in stacked parallel relation, and second electronic camera means disposed to receive said second image array on the face thereof for scanning the segments of said second array in synchronization with the scanning action of said first electronic camera means to produce corresponding electrical video signals.

9. Apparatus in accordance with claim 8, further comprising means for synchronizing the image immobilizing means with the scanning rates of said first and second electronic camera means.

10. Apparatus as recited in claim 8, further comprising third and fourth image transformer means disposed to receive, respectively, second portions of the line images of the successive portions of the reconnoitered area, said third and fourth image transformer means being effective to separate the respective said second portions into third and fourth series of line segments and for rearranging the segments of said third and fourth series into third and fourth image arrays on the faces of the first and second electronic camera means adjacent the first and second image arrays, respectively, the segments of the third and fourth arrays being rearranged in stacked parallel relation.

11. Apparatus in accordance with claim 10, further comprising means synchronized with the action of said image immobilizing means and with said scanning rate to render each of said first and second electronic camera means alternately responsive and unresponsive to the image arrays corresponding to successive visual line images of the reconnoitered area.

12. Apparatus as set forth in claim 11 in which the synchronized means comprises an interrupter mechanism interposed between the first and second camera means and the respective image transformer means for alternately interrupting the optical paths producing the image arrays corresponding to successive visual line images of the reconnoitered area.

13. Apparatus in accordance with claim 8, further comprising means for recording the electrical video signals, means for reproducing the recorded video signals, and radio transmitting means for transmitting the reproduced video signals to a remote station.

References Cited by the Examiner

UNITED STATES PATENTS

| | | |
|---|---|---|
| 2,786,887 | 3/1957 | De France. |
| 2,891,108 | 6/1959 | Wiens _____________ 178—6.7 |
| 2,931,857 | 4/1960 | Hammond ________ 178—6.7 X |
| 2,949,055 | 8/1960 | Blackstone __________ 178—6.5 |
| 2,972,280 | 2/1961 | Kudar _____________ 178—7.6 |
| 2,993,403 | 7/1961 | Harries. |
| 3,004,464 | 10/1961 | Leighton ____________ 178—6.5 |
| 3,019,292 | 1/1962 | John _____________ 178—6.7 |
| 3,036,153 | 5/1962 | Day _____________ 178—7.6 X |
| 3,109,057 | 10/1963 | Slavecki ____________ 178—6.5 |
| 3,141,106 | 7/1964 | Kepany. |

FOREIGN PATENTS 780,976   8/1957   Great Britain.

OTHER REFERENCES

Journal of the SMPTE, vol. 69, No. 10, October 1960, TR 845.5678, page 708 relied upon.

DAVID G. REDINBAUGH, *Primary Examiner.*

ROY LAKE, J. C. LAWSON, H. W. BRITTON,
*Assistant Examiners.*